(Model.)
S. P. STODDARD.
MORTISE LOCK.
No. 254,402. Patented Feb. 28, 1882.
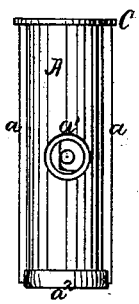
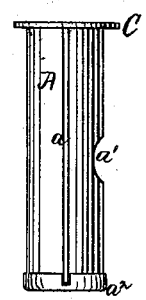
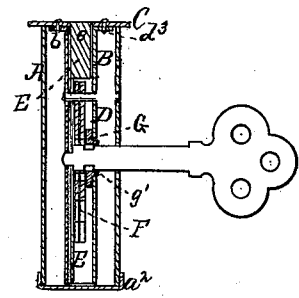
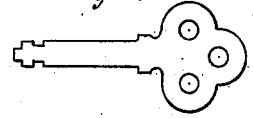
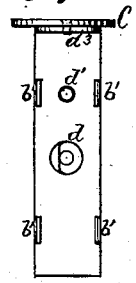
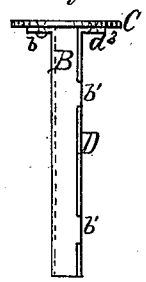
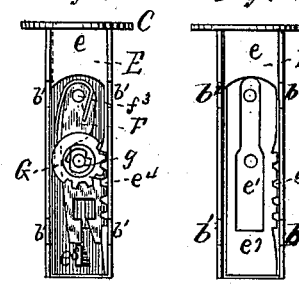
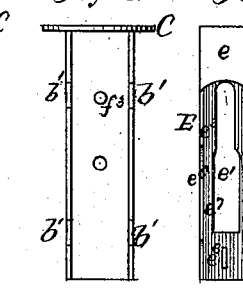
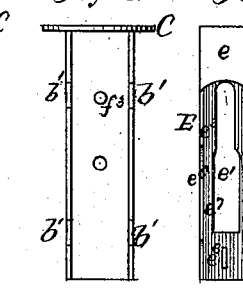
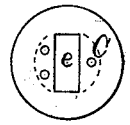
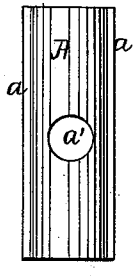
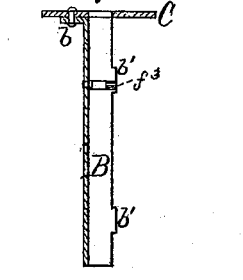
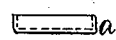
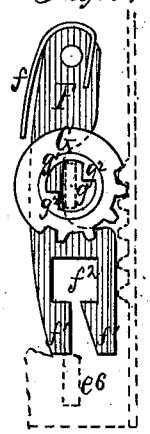
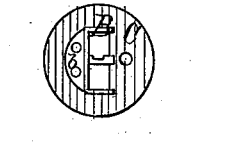
Witnesses:
Henry Eichling
A. S. Fitch
Inventor.
Solomon P. Stoddard
By J. S. Fitch
His Atty.

UNITED STATES PATENT OFFICE.

SOLOMON P. STODDARD, OF NEW YORK, N. Y.

MORTISE-LOCK.

SPECIFICATION forming part of Letters Patent No. 254,402, dated February 28, 1882.

Application filed September 2, 1881. (Model.)

*To all whom it may concern:*

Be it known that I, SOLOMON P. STODDARD, of the city, county, and State of New York, have invented certain new and useful Improvements in Mortise-Locks, of which the following is a full, clear, and exact description, reference being had to the accompanying drawings, forming part of this specification.

My invention relates more particularly to mortise-locks, or those which are seated in a recess in the object to which they are applied; and my invention consists in the novel construction and arrangement relatively to each other of the parts and devices hereinafter particularly specified, whereby the results set forth are secured, and as more at length recited in the claims.

In the drawings, Figure 1 is an elevation of my improved lock complete on the side in which is the keyway, and Fig. 2 is a similar view of the same turned one-quarter round. Fig. 3 is a central longitudinal section of the same, and showing the key seated in the lock. Fig. 4 is a side view of the key which operates the lock shown in the drawings. Figs. 5 and 6 are a side and edge view of the inner sheath of the lock withdrawn from the outer case. Fig. 7 is a side view of the same with the side plate removed, disclosing the interior mechanism of the lock. Fig. 9 is a similar view of the same, the pinion and tumblers being removed. Fig. 10 is a similar view of the empty inner sheath. Fig. 11 shows a side and longitudinal central section of the bolt. Fig. 12 is a detached view of the outer case. Fig. 13 is a top view of the sheath shown in Fig. 6, showing the face-plate. Fig. 14 is a cross-section of the outer case. Figs. 15 and 16 are side views, respectively, of the tumblers and the pinion. Fig. 17 is a central longitudinal section of the inner sheath and its attached face-plate. Fig. 18 is an edge view of the cap which closes the lower end of the outer case. Fig. 19 is an enlarged view of the tumblers and the pinion, showing their arrangement in relation to the bolt and its rack. Fig. 20 is an enlarged side view of the pinion, and Fig. 21 is a bottom end view of the inner sheath.

A is the outer case of my improved lock. This may be in the form of a cylinder, as shown, and provided with longitudinal ribs $a$, which are preferably formed by folding the longitudinal edges of one half-cylinder about the similar edges of the other half-cylinder, as shown in Fig. 14; or the case may be made polygonal in cross-section, the object being to prevent the turning of the case in the recess in which it is seated. The said case has a keyway or opening, $a'$, in its side, and is preferably closed at its lower end by the cap $a^2$.

B is the inner sheath of the lock, containing the working mechanism, and is in the form of an open-ended trough, preferably rectangular, the upper end of which is closed by the face-plate C, which is riveted to it, a flange, $b$, being formed on the sheath for that purpose, and the lower end being left open, while the open side is arranged to be closed by a side plate, D. This plate D has a circular opening or keyway, $d$, in it, hereinafter mentioned, and also an opening, $d'$, to receive the end of the tumbler-pin, and it is secured in place upon the sheath B by means preferably of projection $b'$ on the longitudinal top edges of the sheath, which fold over and upon the edges of the side plate, said edges of the side plate having shallow notches $d^2$ formed in them to receive said parts $b'$, as seen plainly in Figs. 5, 6, 10, and 17. The side plate also has a flange, $d^3$, at its upper end, by which it is riveted to the face-plate C, as seen in Figs. 5 and 6. The inner sheath, containing the working mechanism, is, when closed as described, adapted to slide into the outer casing, A, and its keyway be coincident with that of the outer casing, the face-plate C closing down upon and projecting, like a flange, about the upper end of said outer casing, A, as shown in Fig. 3. The lock thus cased may then be seated in its recess in the object to which it is to be applied.

The operating mechanism of my lock consists of a bolt, the tumblers, and a pinion; and I will now proceed to describe these parts and their arrangement and operation relatively to each other.

E is the bolt, which I form with the solid end $e$, and a trough-like body having the longitudinal slot $e'$ in its bottom plate, $e^7$, in which the key and the tumbler-pin work when the bolt is shot, and the continuous longitudinal sides $e^2$ and $e^3$, extending backward from the solid end $e$ throughout the length of the bolt, as seen plainly in Fig. 11. When the bolt is seated in the sheath B these continuous sides $e^2$ and $e^3$ serve to give bearings for the entire length of the bolt along its sides against the sides of said inner sheath, as shown plainly in Fig. 9, and, together with the bottom plate of the bolt, prevent any lateral movement of the bolt in its said seat. By means of this form and arrangement of the bolt I am enabled to employ a much larger bolt than where the bearing furnished is only upon one edge of the bolt. Upon the edge of one of the sides, $e^2$, is formed the inwardly-turned rack $e^4$, hereinafter described, and the top of the other edge, $e^3$, is somewhat cut away at $e^5$, for a purpose hereinafter stated. The tumbler-stop $e^6$ is fixed at the rearward end of the bolt, as shown. The tumblers F, two or more in number, as desired, are shown in outline in Fig. 15 provided with suitable springs, $f$, stumps $f'$, and slots $f^2$. The bolt being seated in the inner sheath, B, the tumblers are placed in the trough-like recess of the bolt by slipping them upon the pin $f^3$ and throwing their springs to a bearing against the inside of the side $e^3$ of the bolt. The tumblers thus rest upon the bottom plate or rear side of the bolt, their springs $f$ holding them so that the ends of their stumps $f'$ engage the stop $e^6$. On the upper side of these tumblers I now place the pinion G, the teeth of which mesh into and engage the teeth of the rack $e^4$ of the bolt, and the perimeter of this pinion, on the side diametrically opposite to its said toothed portion, rests upon and has a bearing on the edge of the side $e^3$ of the bolt where said edge is cut away at $e^5$. By means of this arrangement I am enabled to use a pinion of increased diameter, as it thus occupies the entire space from side to side of the sheath B.

Upon the upper or outer side of the pinion G, about its key-slot $g$, is formed the circular projection or hub $g'$, which when the parts are in place, as described, and the side plate, D, is in position on the sheath, extends through and has a bearing in the opening $d$ in said side plate, being thus held in its proper place in the mechanism.

I provide the pinion G with the key-slot $g$, which is so constructed, as to outline and form, that the key may be turned in the lock to disengage the tumblers before beginning to rotate the pinion. This may be, and is preferably, accomplished by making the slot $g$ in its outline in the form of an hour-glass—that is to say, a circular slot having upon its inner edges the two diametrically-opposite inwardly-pointed angular projections $g^2$, as shown plainly in Figs. 16 and 20. By means of this slot thus formed I am enabled to assemble the bolt, tumblers, and pinion in the sheath B in the manner described, the pinion being upon the top or outer side of the tumblers, and by means of a suitably-stepped key, as shown, I lift the tumblers before the bolt begins to be moved inward or outward, for it is evident that the key being introduced, as shown, it will pass through the key-slot in the pinion, and, upon being turned, will travel one-quarter of a turn without moving the pinion, while during this quarter-turn the bits of the key will lift and disengage the stumps of the tumblers, thus permitting the bolt to be shot, and that upon the completion of said quarter-turn the key will then engage the projections $g^2$ in the key-slot of the pinion, and consequently shoot the bolt outward by the operation of the rack on the bolt which engages the pinion. While the bolt is moving, the stop $e^6$ enters the slot $f^2$ of the tumblers, and when it is shot the tumblers are so operated upon by their springs that the stop $e^6$ engages the inner edge of said slot. In shooting the bolt backward a quarter-turn of the key is made without disturbing the pinion, and the tumblers are disengaged. Then the projections $g^2$ in said key-slot are engaged by the key, and the pinion rotated to carry the bolt backward.

It is evident that the pinion G, having its peculiar slot $g$, may be placed below or back of the tumblers, the rack on the bolt being properly shifted also without varying this feature of my invention, as then the key would pass through the tumblers, and its suitably-formed end would enter the slot $g$ in substantially the same manner, and when turned in the lock would operate the parts, as specified.

By means of the construction and arrangement of the parts thus shown and described I am enabled to form my rack upon or as part of the bolt itself, and at the same time to avoid any lost motion in either the pinion or rack, the movement of the bolt being simultaneous and coincident with the movement of the pinion, the disengagement of the tumblers being accomplished while the pinion and bolt are both at rest.

The form, construction, arrangement, and assembling of the various parts herein described in the manner specified enable me to fabricate an inexpensive yet thoroughly durable, effective, and satisfactory lock device.

What I claim as my invention, and desire to secure by Letters Patent, is—

1. A mortise-lock composed of the inner sheath, B, containing the lock mechanism and carrying the face-plate C, and the outer cylindrical case, A, adapted to receive and hold the said sheath, and having the longitudinal ribs $a$, formed by folding the edges of one half-cylinder about the edges of the other half-cylinder, said sheath and case having coincident keyways, substantially as and for the purpose specified.

2. In a mortise-lock, the combination, with the sheath B, as described, of the bolt E, the side $e^2$ of which has the rack $e^4$, the other side, $a^3$, being cut away at $e^5$, together with the tumblers F, seated on the bottom plate of said bolt, and the pinion G, seated on top of the tumblers, and having the hub $g'$ projecting through an opening in the side plate of said sheath, all constructed and arranged to operate as and for the purpose specified.

3. In a mortise-lock, the combination, with the bolt and its rack and the tumblers, of a pinion having a key-slot, which permits the key to make a quarter-turn in said slot and disengage the tumblers before rotating the pinion, substantially as and for the purpose specified.

4. In a mortise-lock, the combination, with the sheath B, the bolt E, and the tumblers F, substantially as described, of the pinion G, having the key-slot $g$, with the two diametrically-opposite inwardly-pointed projections $g^2$, constructed and arranged to operate as and for the purpose specified.

Witness my hand August 30, 1881.

SOLOMON P. STODDARD.

In presence of—
A. G. N. VERMILYA,
A. S. FITCH.